(12) United States Patent
Huang

(10) Patent No.: US 9,207,465 B1
(45) Date of Patent: Dec. 8, 2015

(54) THIN EYEGLASSES JOINT STRUCTURE

(71) Applicant: Wen-Tse Huang, Kaohsiung (TW)

(72) Inventor: Wen-Tse Huang, Kaohsiung (TW)

( * ) Notice: Subject to any disclaimer, the term of this patent is extended or adjusted under 35 U.S.C. 154(b) by 0 days.

(21) Appl. No.: 14/523,975

(22) Filed: Oct. 27, 2014

(51) Int. Cl.
*G02C 5/22* (2006.01)

(52) U.S. Cl.
CPC ..................... *G02C 5/2209* (2013.01)

(58) Field of Classification Search
CPC ........... G02C 5/22; G02C 5/2209; G02C 5/02
USPC ............................ 351/41, 121, 153
See application file for complete search history.

(56) References Cited

U.S. PATENT DOCUMENTS

| | | | | |
|---|---|---|---|---|
| 2012/0212702 A1* | 8/2012 | Jung | ...................... | G02C 11/12 351/158 |
| 2013/0293828 A1* | 11/2013 | Kuo | ..................... | G02C 5/2209 351/121 |
| 2014/0132912 A1* | 5/2014 | Chou | ................... | G02C 5/2209 351/121 |

* cited by examiner

*Primary Examiner* — Huy K Mai
*Assistant Examiner* — Daniele Manikeu
(74) *Attorney, Agent, or Firm* — Alan D. Kamrath; Kamrath IP Lawfirm, P.A.

(57) ABSTRACT

A thin eyeglasses joint structure includes a glasses frame, a temple, and a joint member. The glasses frame includes a first joint portion having a joint section and a fixture section formed at an outer end of the joint section. The temple includes a second joint portion. The joint member includes two spaced connecting slots and a fixing slot. The joint section and the fixture section of the glasses frame are held in the connecting slots and the fixing slot of the joint member, respectively. The joint member has an axle hole penetrated by and coupled with the second joint portion of the temple to develop the thin eyeglasses joint structure without requirement of any screw.

3 Claims, 4 Drawing Sheets

THIN EYEGLASSES JOINT STRUCTURE

BACKGROUND OF THE INVENTION

1. Field of the Invention

The present invention relates to a pair of lightweight thin eyeglasses and, more particularly, to a joint structure for the thin eyeglasses.

2. Description of the Related Art

A pair of conventional eyeglasses usually includes a glasses frame and two temples pivotally fitted at both sides of the glasses frame. Each temple directly joins the glasses frame with a screw to form a joint-like structure, so that the temples can be folded inward or stretched outward. However, the screws may be loosened gradually after a long period and should be tightened occasionally. In virtue of constant evolution on manufacture of a pair of eyeglasses, a pair of high-priced eyeglasses is being designed as a lightweight commodity including a glasses frame and two temples made of light, strong and tensile materials (laminar or linear), which can be directly machined. It can be seen the abovementioned joint-like structures will impose weight on a pair of thin glasses and difficulty as well as costs on a manufacturing process if the junction portions on the glasses frame and the temples made of laminar or linear materials still retain the joint-like structures. Moreover, the drawback of screws loosened is remained as usual.

The design to assemble a pair of eyeglasses with a thin frame emphasizes junction portions on the temples and the glasses frame mostly. In order to directly link laminar materials and realize basic rotation and positioning of the junction portions, a designer has to spend much time on structural design for components being connected to each other. As components to be assembled in a pair of thin eyeglasses, some special members may be neither applicable to other universal components nor easily machined.

Accordingly, a person skilled in the art should design an alternative joint structure to fast assemble and securely fix a glasses frame and temples of a pair of thin eyeglasses.

BRIEF SUMMARY OF THE INVENTION

Thus, an objective of the present invention is to provide a thin eyeglasses joint structure for assembling a temple and a glasses frame without requirement of any screw.

To achieve this and other objectives, a thin eyeglasses joint structure of the present invention includes a glasses frame, a temple, and a joint member. The glasses frame includes a first joint portion extending outward from a side of the glasses frame. The first joint portion includes a joint section and a fixture section formed at an outer end of the joint section. The joint section includes a slotted hole and two connecting portions separated by the slotted hole. The fixture section includes at least one retaining portion protruding from the outer end of the joint section. The temple includes a second joint portion designed as a stick-like component. The joint member includes a first ends, a second end spaced from the first end, and an inner surface provided with two spaced connecting slots and a fixing slot. Each connecting slot is formed in the first end of the joint member. The fixing slot is located between the first and second ends of the joint member and in communication with the two connecting slots. At least one retaining recess is formed in a bottom of the fixing slot. The connecting portions of the joint section and the fixture section of the glasses frame are respectively held in the connecting slots and the fixing slot of the joint member, and the retaining portion of the fixture section is engaged in the retaining recess. A retaining edge is formed in the inner surface of the second end of the joint member, and an axle hole is provided in the second end of the joint member and adjacent to the retaining edge. The second joint portion of the temple is engaged in the axle hole to allow the temple relative to the glasses frame to be folded inward or stretched outward.

The thin eyeglasses joint structure of the present invention features the temple and the glasses frame, both of which are assembled with no screw required, and avoids drawbacks like screw-based components loosened frequently. Moreover, the temple, the glasses frame, and the joint member of the thin eyeglasses joint structure can be made of laminar material easily machined and applicable to different types of eyeglasses.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
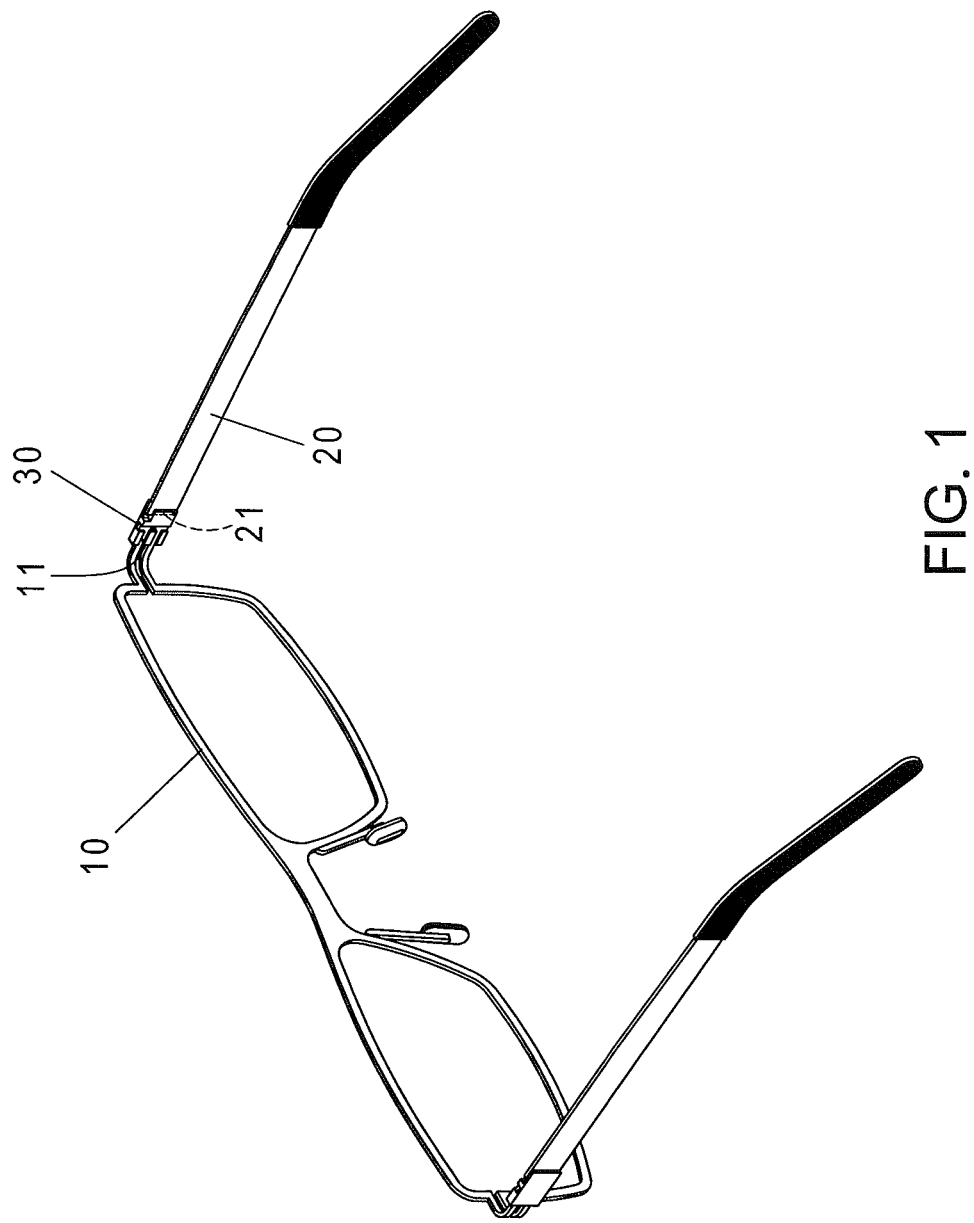
FIG. 1 is a perspective view illustrating a pair of eyeglasses constructed with thin eyeglasses joint structures of the present invention.
Figure 2:
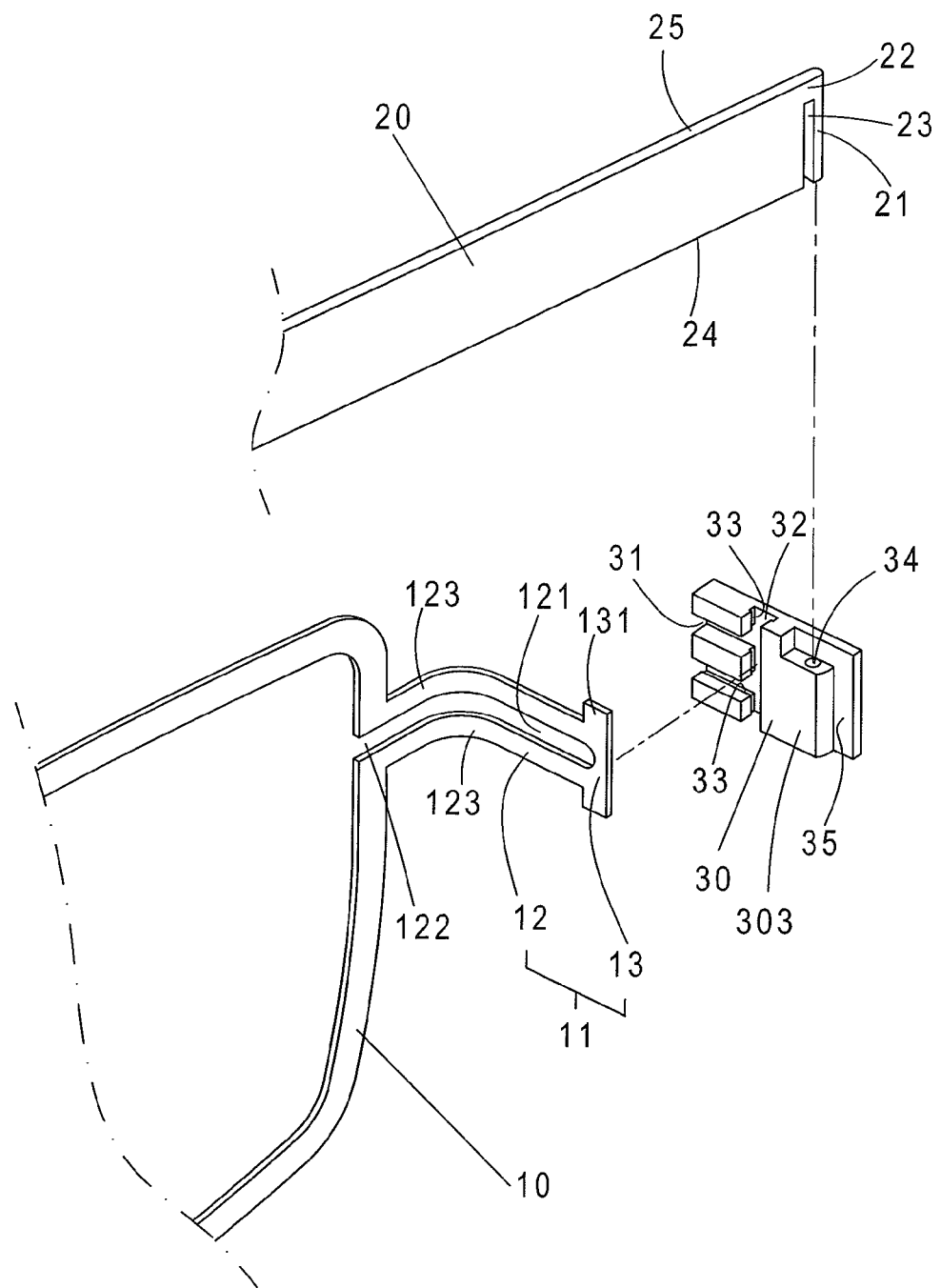
FIG. 2 is a partial, exploded view of the eyeglasses in FIG. 1.
Figure 3:
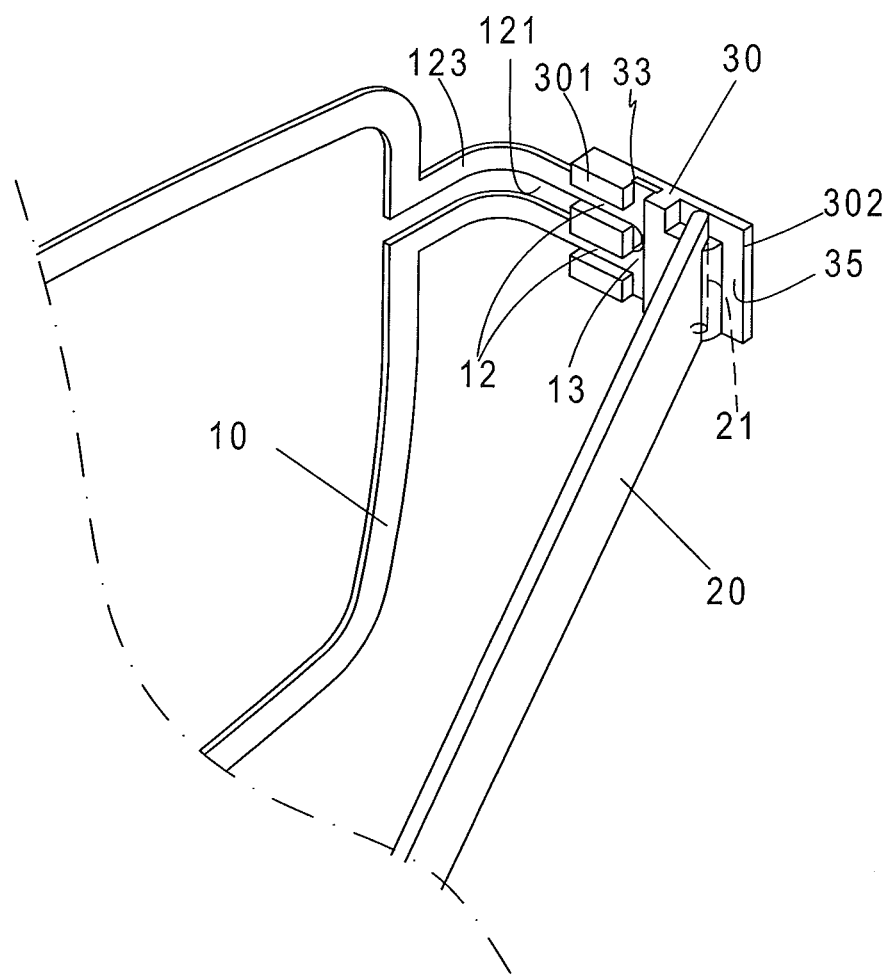
FIG. 3 is a partial enlargement view of the eyeglasses in FIG. 1, with a temple folded inward.
Figure 4:
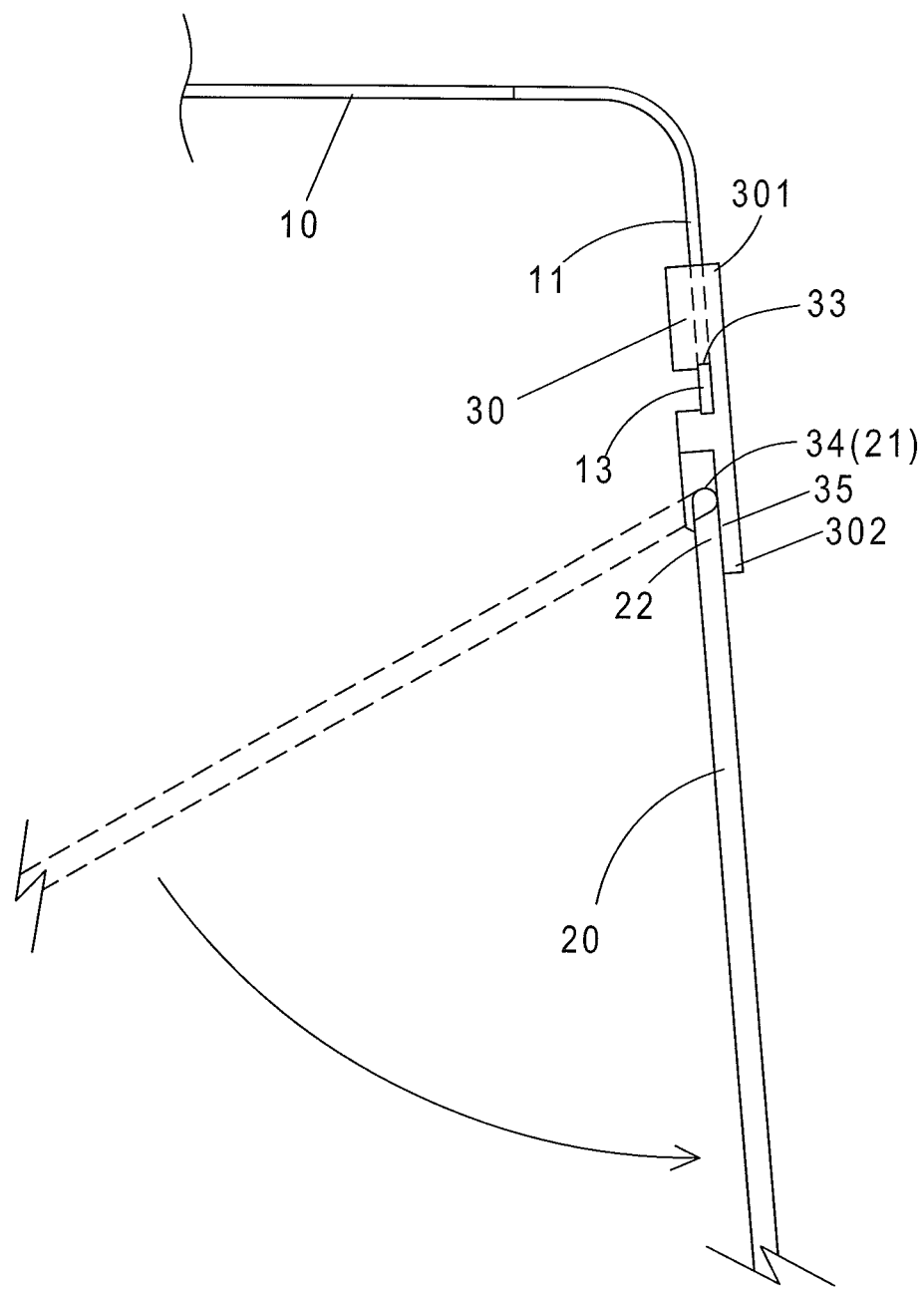
FIG. 4 is a schematic view illustrating the temple of the eyeglasses in FIG. 3 resisting a retaining edge.

A thin eyeglasses joint structure according to the preferred teachings of the present invention is shown in FIGS. 1 through 4 of the drawings and generally includes a glasses frame 10, a temple 20, and a joint member 30. Glasses frame 10 is made of laminar material and has a first joint portion 11 formed at each side thereof. Temple 20 is made of strong and tensile laminar material and has a second joint portion 21 formed at a front end 22 thereof. Joint member 30 links first joint portion 11 of glasses frame 10 and second joint portion 21 of temple 20 for development of the thin eyeglasses joint structure featuring succinct structure and easy assembling.

First joint portion 11 includes a joint section 12 and a fixture section 13. Joint section 12 is extended outward from one side of glasses frame 10 and includes a slotted hole 121 therein. Slotted hole 121 extends along a length direction of joint section 12 and communicates with an opening 122 formed in the side of glasses frame 10, making joint section 12 separated into two connecting portions 123 and allowing joint section 12 to be deformable adequately for assembling or disassembling a lens (not shown in drawings). Fixture section 13 is formed at an outer end of joint section 12 and includes upper and lower retaining portions 131, each of which vertically protrudes from the outer end of joint section 12.

Second junction portion 21 of temple 20 is designed as a stick-like component. In the embodiment, second junction portion 21 is defined by a groove 23 provided in front end 22 of temple 20. Groove 23 opened from a lower end plane 24 of temple 20 extends toward but spaced from an upper end plane 25 of temple 20, so that second junction portion 21 becomes the stick-like component.

Joint member 30 is in the form of a laminar body and includes a first ends 301, a second end 302 spaced from first end 301, and an inner surface 303 extending between first and second ends 301 and 302. Inner surface 303 of joint member 30 is provided with two spaced connecting slots 31 and a fixing slot 32, both of which correspond to joint section 12 and fixture section 13 of glasses frame 10, respectively. Each connecting slot 31 is formed in first end 301 of joint member 30 and extends horizontally along joint member 30. Fixing slot 32 is located between first and second ends 301 and 302 of joint member 30 and extends vertically along joint member 30. Fixing slot 32 is in communication with connecting slots 31 and includes a plurality of sunken retaining recesses 33 in a bottom thereof. An L-shaped recessed portion is designed in inner surface 303 of second end 302 of joint member 30 for development of a retaining edge 35 at second end 302. In addition, an axle hole 34 extending vertically along joint member 30 is provided in second end 302 of joint member 30 and adjacent to retaining edge 35.

The thin eyeglasses joint structure of the present invention in assembling allows connecting portions 123 of joint section 12 and fixture section 13 of glasses frame 10 to be respectively held in connecting slots 31 and fixing slot 32 of joint member 30, so that first joint portion 11 is securely assembled to joint member 30 with retaining portions 131 embedded into retaining recesses 33. As such, joint section 12 subject to connecting slots 31 contributes to holding the lens mounted on glasses frame 10. Furthermore, second joint portion 21 of temple 20 is engaged in axle hole 34, so that temple 20 relative to glasses frame 10 can be folded inward or stretched outward based on a rotational axis defined by second joint portion 21.

Temple 20 which is opened outward (see FIG. 4) will not be excessively stretched and stays at a proper open angle by which a user with a wide face is able to comfortably wear a pair of eyeglasses constructed with the thin eyeglasses joint structures of the present invention because front end 22 of temple 20 is blocked by retaining edge 35 of joint member 30. Namely, front end 22 of temple 20 will abut against retaining edge 35 when temple 20 is opened outward.

The thin eyeglasses joint structure of the present invention features glasses frame 10 and temple 20, which are assembled with no screw required, avoiding drawbacks like screw-based components loosened frequently and heavy weight imposed on an eyeglasses user, and refining a pair of thin eyeglasses. Particularly, the thin eyeglasses joint structure of the present invention contributes to machining glasses frame 10 and temple 20 in a single linear cutting process for a one-piece model including all components made of laminar material, fewer machining steps and manufacturing costs, and higher throughput.

The scope of the invention is to be indicated by the appended claims, rather than by the foregoing description, and all changes which come within the meaning and range of equivalency of the claims are intended to be embraced therein.

The invention claimed is:

1. A thin eyeglasses joint structure, comprising:
   a glasses frame including a first joint portion extending outward from a side of the glasses frame, with the first joint portion including a joint section and a fixture section formed at an outer end of the joint section, with the joint section including a slotted hole and two connecting portions separated by the slotted hole, with the fixture section including at least one retaining portion protruding from the outer end of the joint section;
   a temple including a second joint portion as a stick-like component; and
   a joint member including a first ends, a second end, and an inner surface, with the inner surface of the joint member provided with two spaced connecting slots and a fixing slot, with each connecting slot formed in the first end of the joint member, with the fixing slot located between the first and second ends of the joint member and being in communication with the two connecting slots, with at least one retaining recess formed in a bottom of the fixing slot, with the two connecting portions and the fixture section of the glasses frame respectively held in the two connecting slots and the fixing slot of the joint member, with the retaining portion engaged in the retaining recess, with an axle hole provided in the second end of the joint member, with the second joint portion of the temple engaged in the axle hole to allow the temple relative to the glasses frame to be folded inward or stretched outward.

2. The thin eyeglasses joint structure according to claim 1, wherein the slotted hole extends along a length direction of the joint section and is in communication with an opening formed in the side of glasses frame, with the second junction portion defined by a groove provided in a front end of the temple, with the groove opened from a lower end plane of the temple extending toward but spaced from an upper end plane of the temple.

3. The thin eyeglasses joint structure according to claim 2, wherein a recessed portion is designed in the inner surface of the second end of the joint member for development of a retaining edge, with the front end of the temple abutting against the retaining edge when the temple is opened outward.

* * * * *